United States Patent [19]

Gutmann et al.

[11] Patent Number: 4,731,639

[45] Date of Patent: Mar. 15, 1988

[54] MICROFILM PICKUP CAMERA WITH MARKING MEANS FOR SCREENED ORIGINALS

[75] Inventors: Walter Gutmann, Sauerlach-Arget; Gerhard Schreiner, Munich; Wolfram Betzold, Hoehenkirchen; Wilfried Hofmann, Taufkirchen; Traugott Liermann, Unterhaching; Klaus Schiessl, Wolfratshausen, all of Fed. Rep. of Germany

[73] Assignee: Afga-Gevaert Aktiengesellschaft, Leverkusen, Fed. Rep. of Germany

[21] Appl. No.: 24,379

[22] Filed: Mar. 10, 1987

[30] Foreign Application Priority Data

Mar. 17, 1986 [DE] Fed. Rep. of Germany ....... 3608912

[51] Int. Cl.[4] ....................... G03B 27/32; G03B 27/52

[52] U.S. Cl. ................................. 355/64; 346/140 R

[58] Field of Search ....................... 355/29, 64, 65, 39, 355/40; 346/75, 140 R

[56] References Cited

U.S. PATENT DOCUMENTS

| | | | |
|---|---|---|---|
| 3,922,084 | 11/1975 | Burton et al. | 355/64 X |
| 3,988,062 | 10/1976 | Burton et al. | 355/23 |
| 4,052,128 | 10/1977 | Burton et al. | 355/23 X |
| 4,116,560 | 9/1978 | Dragani et al. | 355/64 X |
| 4,161,362 | 7/1979 | Blake | 355/64 X |
| 4,283,621 | 8/1981 | Pembroke | 355/64 X |
| 4,577,956 | 3/1986 | Klosterhuber et al. | 355/64 X |

*Primary Examiner*—Richard A. Wintercorn
*Attorney, Agent, or Firm*—Michael J. Striker

[57] ABSTRACT

A microfilm pickup camera comprises a device for continually horizontally transporting originals to be projected in the camera through the camera, and an ink printing head for marking originals before they enter an exposure station provided in the camera. The ink printing head is provided with a drive which pivots, rotates and displaces the ink printing head between a use position, a cleaning position and a non-operative position. The printing head is EDV-controlled.

18 Claims, 6 Drawing Figures

MICROFILM PICKUP CAMERA WITH MARKING MEANS FOR SCREENED ORIGINALS

BACKGROUND OF THE INVENTION

The present invention relates to a microfilm pickup camera.

Microfilm pickup or surveying camera of the foregoing type includes transport means through which an original to be reduced, after the insertion thereof into the camera, is continually and horizontally moved, and means for marking the original before it reaches an exposure or projection station for a reduced projection of the original.

Microfilm cameras provided with mechanically or electronically-operated stamping mechanisms have been known. These mechanisms have been employed usually to print or stamp numbers on the originals being projected. In conventional needle-type printers EDV-contollable processing speeds of operation should be rather low. The EDV-controllable ink spraying mechanisms used for marking originals can however operate with sufficiently high speeds and, with their nozzles normally directed horizontally, must be reliable in non-use position before drying-up of the ink; they often require some servicing and cleaning operations, for example the removal of air in the underpressure-operated nozzles, or scraping ink residuals from the nozzles.

SUMMARY OF THE INVENTION

It is an object of the present invention to provide an improved microfilm pickup camera in which an ink spraying mechanism can be used with a horizontally running original and this mechanism can be easily put into operation.

This and other objects of the invention are attained by a microfilm pickup camera, comprising transport means for transporting originals to be reduced, inserted into the camera so that each original is continually horizontally moved within the camera; an exposure station for a reduced projection of the originals; and marking means for marking originals before they reach said exposure station, said marking means including an ink spraying head controlled by a computer and directed in a use position approximately vertically downwardly relative to a horizontally movable original, said head having nozzles and being rotatable to a cleaning position, and a diaphragm cover, said head being also rotatable and displaceable relative to said diaphragm cover to an inoperative position to protect said nozzles from dry ink residuals.

The spraying head may be rotatable to said cleaning position by hand.

The camera may include an electronic control device, said spraying head being rotatable to said cleaning position by said control device.

The ink spraying head may be formed as an underpressure-ink spraying mechanism, said marking means further including a housing having a cover and accessible when said cover is open, and an ink supply container connected to said spraying head and positioned in said housing below a level of said head when the latter is in said use position.

The camera may further include a locking device for said cover, said locking device being connected to said control device; and selection means connected to said control device and controlling said cleaning position so as to release said cover whereby said supply container is accessible and is set to said cleaning position by hand under pressure.

The camera may further include a housing cover, said ink spraying head being accessible when said housing cover is opened, and a scraper actuated by hand, said nozzles of said ink spraying head in said cleaning position or in a position deviating from said cleaning position lying in a way of moving of said scraper.

The means for rotating and displacing said ink spraying head may be provided in the camera, which include an electric motor, a drive disc engageable with and supporting said spraying head, an overload coupling interconnected between said motor and said drive disc, and a torsion spring coupling said spraying head with said drive disc.

Said means may further include a bearing eccentric for supporting said spraying head on said drive disc, said torsion spring having two radially protruding ends, said drive disc having an eccentric pin, said spraying head having also an eccentric pin, said eccentric pin of said drive disc being clamped with said eccentric pin of said spraying head between said protruding ends.

The spraying head may have an eccentric, a control pin positioned opposite to said bearing eccentric, said control pin driving said torsion spring.

Said means may further include a control cam face formed by two radial control slots which are offset from each other by about 90° and selectively receive and engage said control pin in a use position or in an inoperative position of said spraying head.

The camera may further include a pressing spring acting on said diaphragm cover and compressable so as to press said diaphragm cover against said spraying head when the latter is in said inoperative position.

Said means may further include a spring-biased gripping lever positioned between said radial control slots in a path of movement of said control pin, said lever having a hook-shaped end at which said control pin, upon selection and reaching said cleaning position by said spraying head, is locked, a first switch element positioned on said drive disc, and a stationary second switch element, said first switch element cooperating with said second switch element in said cleaning position so that said electric motor is switched off in said cleaning position selected by said control device or by said selection means.

The first and second switch elements become inoperative upon switching the camera off by said electronic control device for said cleaning position, said gripping lever being pivotable under the action of said bearing eccentric by means of said control pin, and further including a third switch element on said spraying head and a fourth stationary switch element, said control pin being movable in said radial slot for said inoperative position, and said electric motor being switchable off by said third and fourth switch elements.

The gripping lever may have a hook-shaped notch merging into said hook-shaped end, said gripping lever and said spraying head being rotatable relative to each other by hand to a further servicing position, said control pin being lockable by said notch and said ink spraying head being further directed upwardly than in said cleaning or inoperative position.

The camera may further include a stationary fifth switch element, said third switch element in said use position cooperating with said fifth switch element for switching said electric motor off during a marking process on said original.

The transport means of the camera may be coupled to said electronic control device so that a transport speed of originals is synchronzied with a pressure pace of said spraying head.

Said transport means may be controlled by said electronic control device so that speeds of originals moving under said ink spraying head and in said exposure station are synchronized.

The spraying head may jointly with its drive be displaceable transversely of a direction of moving of said originals.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
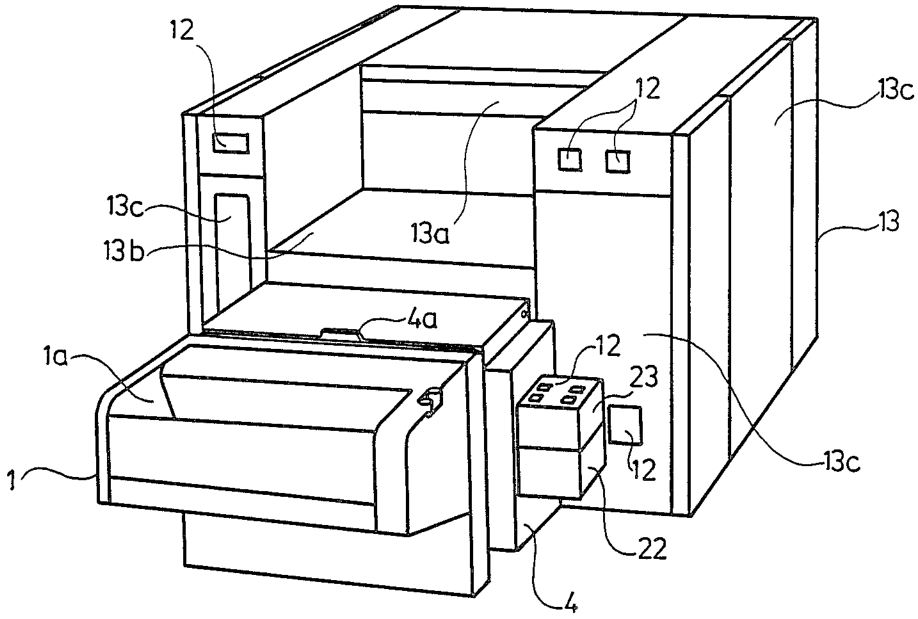
FIG. 1 is a perspective view of the microfilm surveying camera according to the invention.
Figure 2:
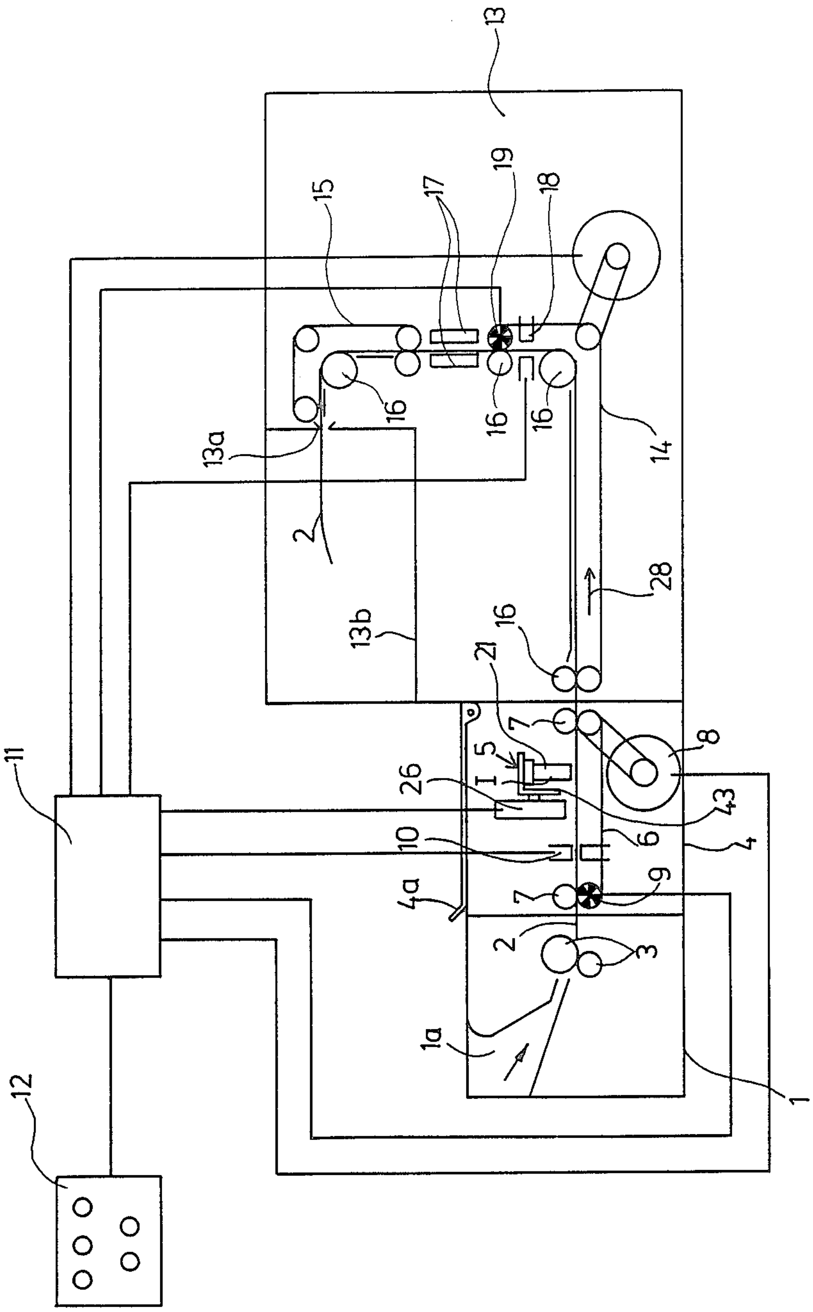
FIG. 2 is a schematic view of a transport system for an original in the camera of FIG. 1.

FIGS. 1 and 2 of the drawings show a microfilm pickup or surveillance camera which has substantially three housing parts. A housing part 1 which is positioned before a user serves for the insertion of the original being screened and has an insertion compartment **1*a* for an original 2, and at least one transport roller pair 3 driven upon the switching-on of the device by means of a non-shown main switch. A gap from the insertion housing part 1 leads to a second housing part 4 which is accessible via a cover 4*a* from above. The second housing part 4 serves to accommodate a marking device 5 for marking the horizontally movable original 2. For transporting the originals, a driving endless tow or trailing belt 6 and transport rollers 7, connected to and lying opposite to the belt, are provided in the camera, whereby the originals lie on the tow belt 6. A schematically shown drive 8 of the belt as well as control device 9 for controlling the speed of moving originals and a light barrier 10 are connected with an electronic control device 11 which can be coupled with a control panel and/or indication or reading panel with control lamps 12**.

From the marking device 5 the originals are transported through guiding gaps into a third portion of the camera, which has a separate camera housing 13. Tow belts 14, 15 with feed rollers 16 positioned in the housing 13 provide guiding surfaces for transporting the originals. A tow belt drive 14 is deflected upwardly by 90° before an exposure station 17. Immediately before the exposure station, are provided a further light-barrier 18 and a further speed-controlling device 19 which are connected with the control device 11. Both photoelectric light barriers 10 and 18 control the passage of the inserted original while controlling devices 9 and 19 serve to synchronize the speed of transporting in the second housing part 4 and the pickup part 13. A transport belt 15 is also deflected by 90° so that the projected original 2 is turned by 180° and moved through the input gap **13*a* and can be collected on a collecting desk 13*b*. The camera housing 13 can have a number of covers or removable wall parts 13*c* through which the interior of the camera is accessible for servicing and repair purposes. The camera housing 13 also has operating or indicating panels 12**.

Only two pressure and guiding plates of the exposure station 17 are shown because other structural components of such station such as an objective, a film platform, further guiding elements for the film material and other arrangements are conventional. The camera is designed so that the original is transported through the exposure station. It is also however possible that the original be inserted into the exposure station over its entire format and there be briefly subjected to exposure. The marking of the original by means of the marking device 5 before the exposure is carried out for facilitating the determination of the correspondence of the originals to microfilms or for tabulating of microfilms or microfiches. Mechanical printing or stamping mechanisms have been utilized for this purpose until now. These mechanisms have, due to the difficulties of stamping at a high speed, the disadvantage that they can be utilized only for numbering or paging of originals whereas it has been necessary more or more often to mark on originals being screened their other characteristics, for example numbers for dockets. For this purposes EDV-or computer-controlled marking mechanisms are required, which can print numbers positioned in superposed rows in the direction transversal to the direction of transporting of originals. Furthermore, non-impact printing mechanisms, also non-mechanical printing mechanisms are more advantageous for running originals because these mechanisms operate more rapidly. Therefore an ink-spraying mechanism which is preferably an under-pressure ink spraying mechanism is utilized herein as the marking device 5. The ink-spraying mechanisms have certain features which require in connection with the microfilm pickup camera specific consideration. Generally the inks are utilized which are dried quickly; these inks become dried quickly on non-sucked originals and on base plates or supports which have good adherence to originals being screened, such as various types of paper.

The utilization of the underpressure operating ink-spraying mechanism must be such that the downwardly vertically directed printing head of an ink supply container 20 (FIG. 3) must lie deeper than a nozzle plate of the ink printing head 21. Thereby outside the marking housing portion on and below the level of the nozzle plate of the ink printing 21 in its operative position, an ink device housing 22 is provided, in which the ink supply container 20 is accommodated. The ink device housing 22 is closable by a cover 23 which can have a servicing panel 12 with operation keyboards and/or signalling lamps. The cover 21 is closable by an electric or electromagnetic locking device 24 which is in connection with the electronic control device 11. The later serves to open the cover 23 of the ink mechanism housing 22 only when the ink printing or spraying head 21 is moved, via the control of the key, which is according to the drawings (FIG. 3) a service-key S, to the operative position shown in FIG. 4. A controlling key C can be actuated when the printing operability of the ink spraying mechanism is examined. Furthermore, the keys P and PR are provided on the cover 23; by means of these keys an order of printing in the normal direction of reading or the direction of the mirror image can be programmed.

A further specific feature of the underpressure-operating ink-spraying device resides not only in that the printing head 21 in its use position is directed downwardly in the direction of spraying but also in that, in addition to sucked air or pressure air residues during the feeding towards the nozzles, this air is removed and the nozzles are vented also, and in case of the occurrence of dried ink residues of the quickly-dried ink, these residues must be scraped off and the printing head 21 in a non-use position must be closed by a diaphragm cover 25 so that no overpressure from outside would occur at the nozzles and the ink menisci in the nozzles would not be damaged.

Figure 3:
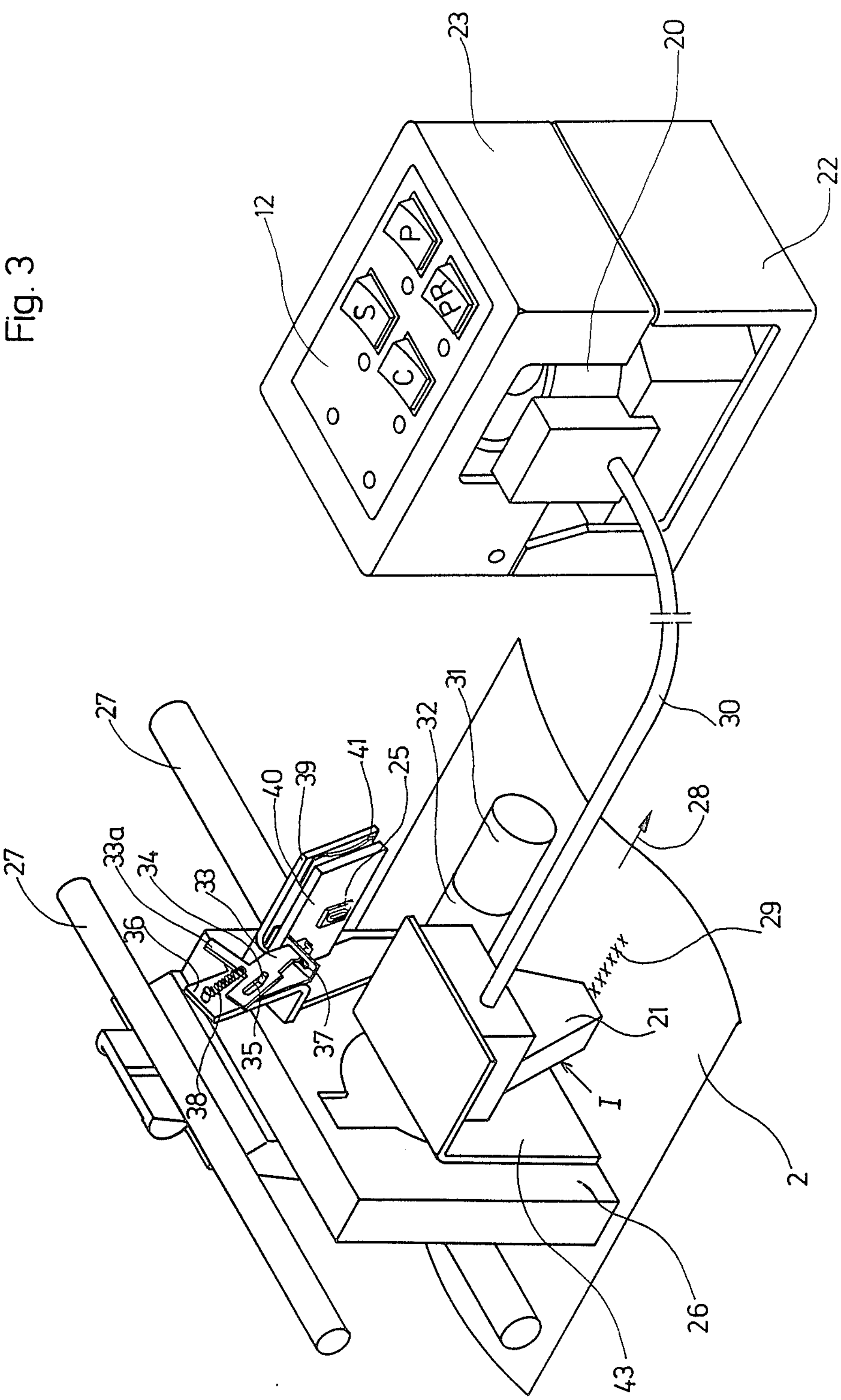
FIG. 3 is a perspective view of the part of the camera of FIG. 1 with an ink-spraying head in an operative position.

The printing head 21 must be automatically pivoted from its use position I shown in FIGS. 2 and 3, by actuation of the key S to the operative position II in which the nozzle plate is inclined at least to some extent upwardly and is accessible. Furthermore the printing head 21 must be automatically moved, upon the switching of the machine off and/or interruption due to the non-insert original, to a non-operative position in which the printing head is pivoted relative to the diaphragm cover 25 and displaced. Upon repeated actuation of the machine the ink-spraying head 21 must be automatically moved again in the downward direction to its use position I. The control of the drive for the above described sequence of operational steps is carried out by the electronic control device 11.

Figure 4:
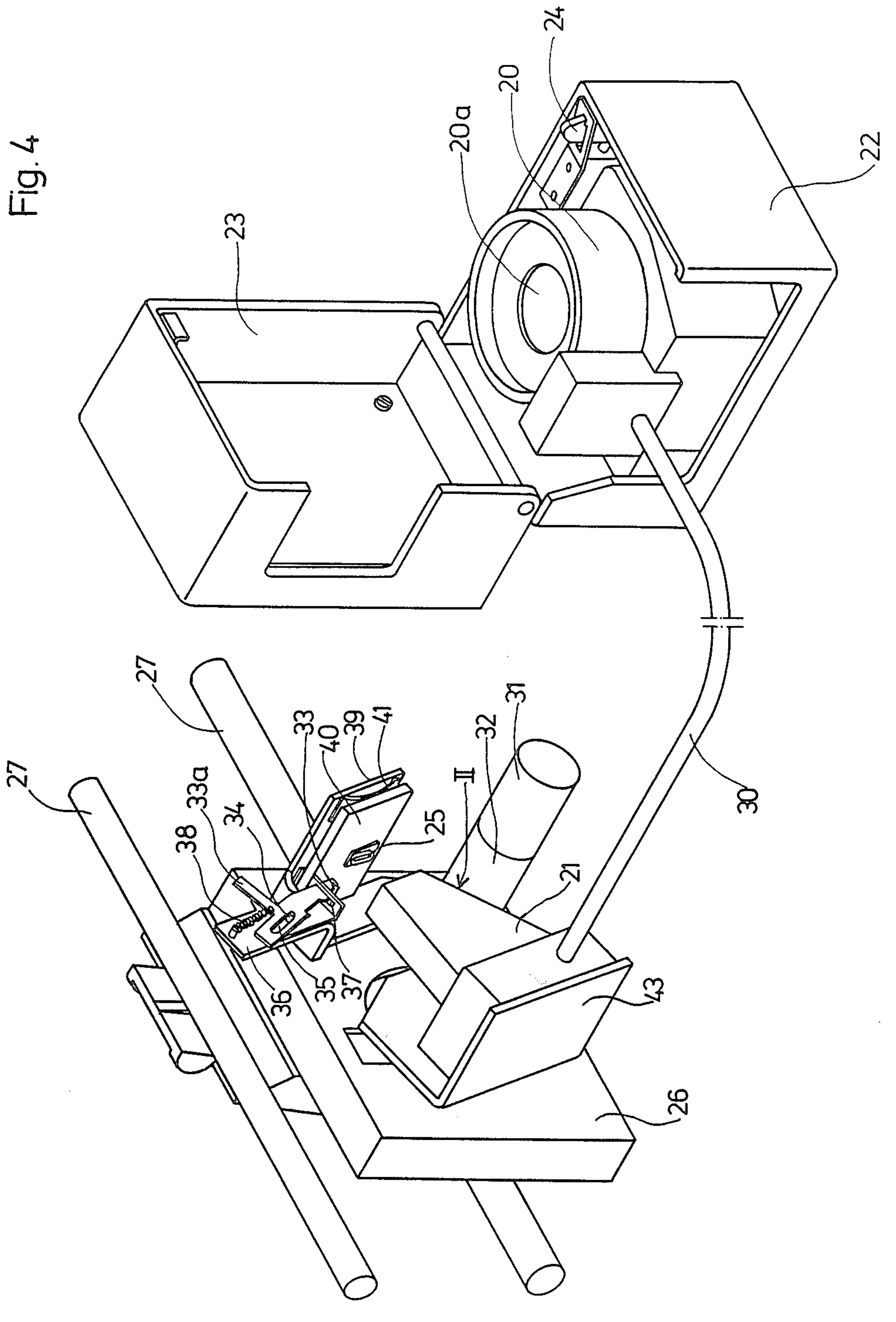
FIG. 4 is a perspective view of the part of the camera of FIG. 3 in a cleaning or venting position.
Figure 5:
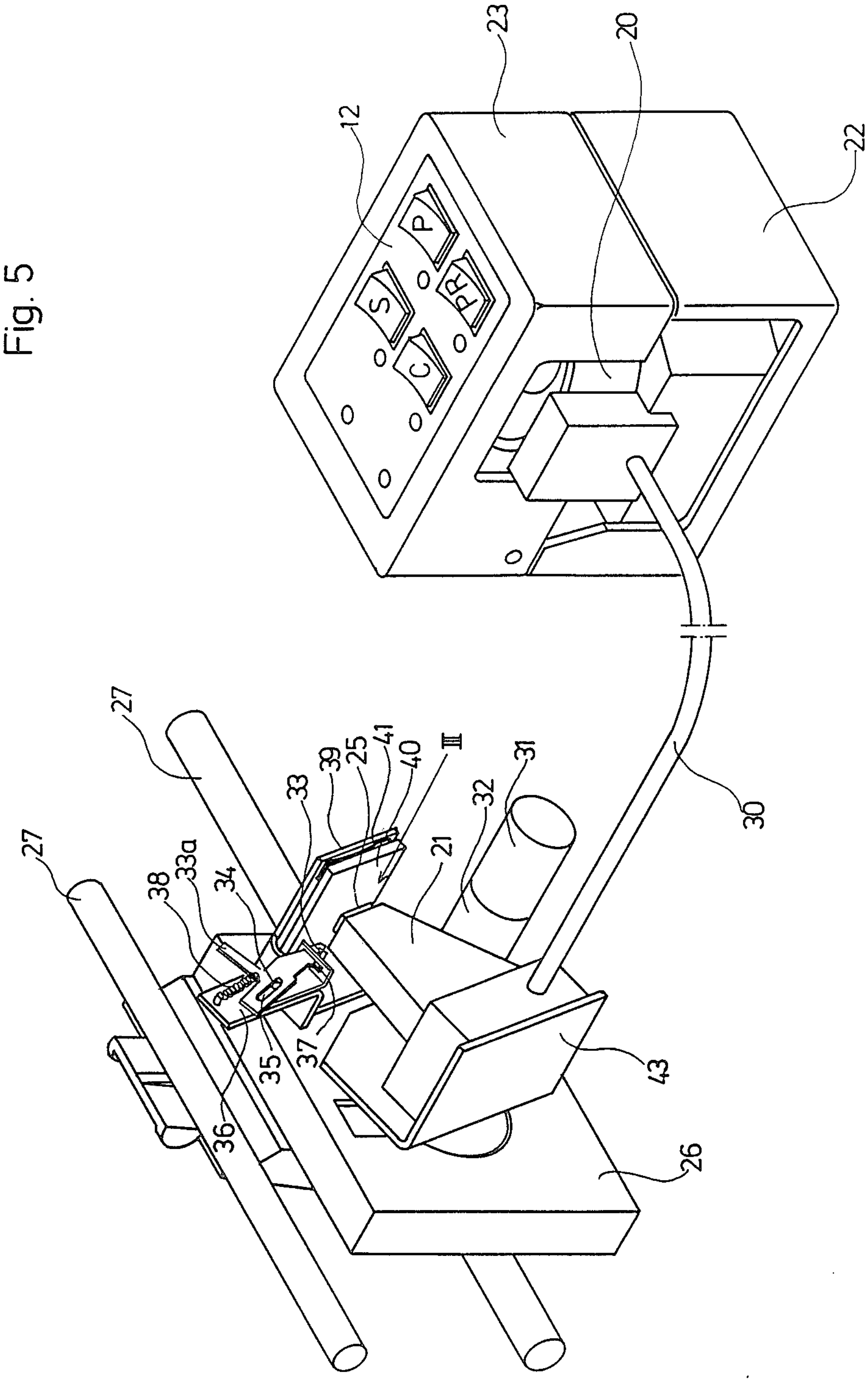
FIG. 5 is the part of the camera of FIG. 3 in the inoperative position.

FIGS. 3 through 5 illustrate the printing head 21 in three positions I to III. The drive and transmission are accommodated in a drive housing 26 displaceable along guide rods 27 which extend transversely of the direction 28 of transporting of the original 2 by means of a non-shown motor or manually in accordance with EDV-control for the printing head. If the printing head 21 is adjusted relative to the original being marked in a correct horizontal position 29 (FIG. 3) this head remains fixed during the printing process whereas the original being marked is moved thereunder.

If now a signalling lamp provided for this purpose indicates that the printing on the original is not clear the key S is actuated so that the printing head by means of the control device 11 is pivoted towards the position II so that it is slightly inclined upwardly. In this position the cover 23 automatically bursts open and cover 4*a* is opened by hand. For venting the nozzles, one can now press on the diaphragm 20*a* of the ink container 20 by hand so that ink will be sprayed via a conduit 30 through the nozzles and the latter would be vented. The superfluous ink drops onto a cotton roll 32 interchangeably placed in the container 31.

In the operative position II shown in FIG. 4 a scraper 33 positioned above the nozzle plate of the printing head 21 is actuated by hand. The scraper 33 is supported on an angular plate 36 at the drive housing 26 by means of a pin-slot guide 34, 35 and has an end which extends through a slot 37 of the angular plate 36 and is pulled or biased upwardly by a spring 38. In the operative position according to FIG. 4, scraper 33, upon requirement, is pushed at an arm 33*a* thereof downwardly by hand. Thereby the scraper moves due to the position of both slots 35 and 37 so that it pivots relative to the end face of the nozzle plate of the printing head 21 and is taken along by the same whereby dried ink residuals are scrapped off the nozzle plate.

In the operative position II of FIG. 4 the diaphragm cover 25 lies against the end face of the nozzle plate of the printing head 21. The fastening of the cover 25 is carried out by a plate 39 secured to the drive housing 26. Between the plate 39 and a plate 40 supporting the diaphragm cover 25 are provided compression springs 41. Upon switching of the apparatus off or interruption of the screening process, the printing head 21 is pivoted through its operative position II to a non-operative position III relative to the diaphragm cover 25 so that the printing head or the nozzle plate under the compression of springs 41. abuts in a light-proof manner against the diaphragm cover 25. Thereby covers 23 and 4*a* remain closed.

Figure 6:
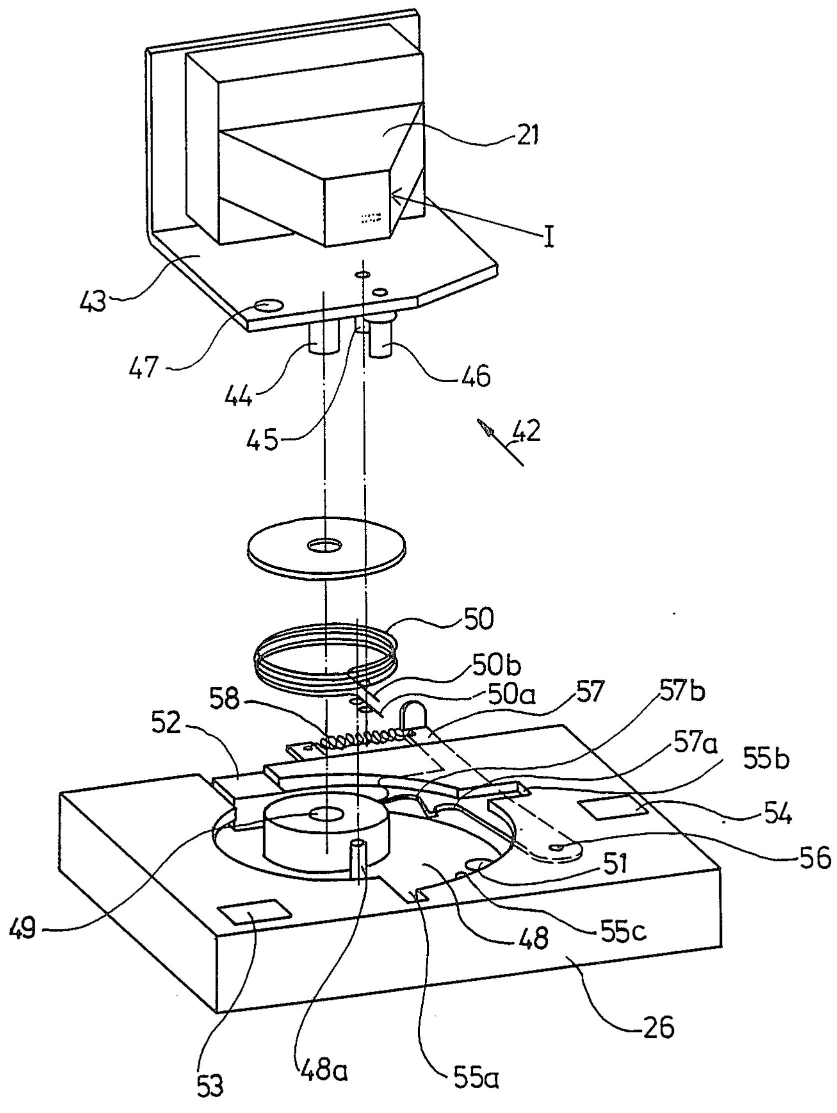
FIG. 6 is an exploded perspective view of an embodiment of the drive for moving the ink-spraying head.

FIG. 6 illustrates an embodiment of the drive transmission for the printing head formed as the ink spraying head. The reference numeral 42 designates the direct of viewing onto tho printing head 21 from below. FIG. 6 shows the printing head 21 and the drive transmission therefor in the position shortly before the printing head reaches the use position I of FIG. 3. The printing head 21 is secured to an angular plate 43. The side of the angular plate 43, which is parallel to the printing direction has an outwardly extended axle 44, an eccentric pin 45, a control pin 46, and a magnetic switch contact 47. A non-seen electric drive motor and an overload coupling are arranged in the drive housing 26. A drive disc 48 is coupled to the drive motor by the overload coupling. Eccentrically of the drive disc 48 is positioned a bearing sleeve 49 for receiving the axle 44 so that the angular plate 43 is eccentrically and rotationally supported on the drive disc 48. A torsion spring 50 is supported around the bearing sleeve 49. A pin 48*a* of the drive disc 48 and the eccentric pin 45 are clamped with each other between radial ends 50*a* and 50*b* of the torsion spring 50. A further magnetic switch contact 51 is positioned at a suitable location on the drive disc 48. The upper side of the drive housing 26, which faces the angular plate 43, has three magnetic switch contacts 52, 53 and 54 and is provided with radial slots 55*a*, 55*b* formed as control curves or cams, and a curved or cam piece 55*c* which lies between the radial slots 55*a* and 55*b*. Below the slot 55*b* is positioned a lever 57 pivotable about an axis 56 and biased in the use position I by the action of a spring 58 to a stop position shown in FIG. 6. The free end of lever 57 is accessible from outside This end has a gripping hook 57*a* and a hook-shaped notch 57*b*.

In the use position I when the printing head is directed downwardly the control pin 46 is inserted in slot 55*a* so that the printing head is fixed. Thereby the drive motor for the printing head is switched off via the magnetic contacts 47, which are positioned opposite to each other. If now key S is actuated so that the operative position according to FIG. 4 is controlled the drive motor is switched on and rotates the drive disc 48. Thereby firstly the prestressed spring 50 slackens and the control pin 46 is moved out from the radial slot 55*a*. When pin 45 is taken along by the ends 50*a* and 50*b* of the spring 50 the printing head 21 rotates. Now the printing head 21 is taken along by the drive disc 48 via the eccentric 49 and spring 50 until the control pin 46 comes into contact with the first hook 57*a* and is held thereby. In this position and upon the actuation of the key S for the operative position II the magnetic switch contact 51 switches the drive motor of the printing head off so that the aforementioned venting and cleaning operations can be performed when the printing head is in the position II.

If in this operative position II the lever 57 is rotated in the clockwise direction and the printing head 21 or the drive disc 48 is rotated by a small amount in the counterclockwise direction by hand the control pin 46 becomes locked by the hook-shaped notch or groove 47*b* of the lever 47. In this position, the printing head 21 had been moved so far upwardly that the nozzle plate can be interchanged. If the locking position is again released the printing head is returned to the operative position II. If finally keys P or C are actuated the printing head 21 is moved back to the use position I.

If the apparatus is switched off or the interruption step is switched on the control pin 46 is moved from the use position I towards the first gripping hook 57a. The drive motor rotates further because the magnetic switch contacts 51, 52 are inoperative. The control pin 46 under the action of the eccentric 49 urges the lever 47 in the clockwise direction laterally and enters the radial slot 55*b* whereby this pin yet remains hanging at the gripping hook 57*a*. When control pin 46 reaches the end of the slot 55*b* the opposing switch contacts 47, 54 will switch the drive motor off. The inoperative position III is obtained. The printing head 21 due to its rotational eccentric support on the drive disc 48 rotates and is displaced relative to the diaphragm cover 25 so that, under compression of the springs 41, the printing head abuts in a light-proof fashion on the diaphragm cover 25. Thereby not only dried up particles of ink in the nozzles but also distruction of ink menisci in the nozzles due to overpressure would be prevented. If the apparatus is again switched on the drive disc 48 rotates in the clockwise direction so that via the torsion spring 50 and pins 48*a* and 45, the control pin 46 is firstly moved inwardly from the radial slot 55*b*. The printing head 21 then rotates until it reaches the use position I.

It is also possible due to this invention to use in the microfilm pickup camera the EDV-controlled ink spraying head 21 which is directed downwardly towards the horizontally movable original with all the advantages and providing that manipulating, cleaning, venting and repair of the ink spraying head would be performed without any difficulties. This is ensured by the possibility of the automatic control of the positions of the ink spraying head in which the spraying head is at least partially directed for service operations or in which the spraying head is closed by the diaphragm cover.

In order to further reduce costs of the apparatus it is possible to move the ink spraying head to different functional positions not by the automatic control device 11 with the use of the drive disc but also by hand. The drive disc 48 would be then rotated by hand at the rim accessible from outside and the drive motor would be omitted.

It will be understood that each of the elements described above, or two or more together, may also find a useful application in other types of microfilm pickup cameras differing from the types described above.

While the invention has been illustrated and described as embodied in a microfilm pickup camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A microfilm pickup camera, comprising transport means for transporting originals to be reduced inserted into the camera so that each original is continually horizontally moved within the camera; an exposure station for a reduced projection of the originals; and marking means for marking originals before they reach said exposure station, said marking means including an ink spraying head controlled by a computer and directed in a use position (I) approximately vertically downwardly relative to a horizontally movable original (2), said head having nozzles and being rotatable to a cleaning position (II), and a diaphragm cover (25), said head being also rotatable and displaceable relative to said diaphragm cover to an inoperative position (III) to protect said nozzles from dry ink residuals.

2. The camera as defined in claim 1, wherein said spraying head is rotatable to said cleaning position by hand.

3. The camera as defined in claim 1, further including n electronic control device (11), said spraying head being rotatable to said cleaning position by said control device.

4. The camera as defined in claim 3, wherein said ink spraying head (21) is formed as an underpressure-ink-spraying mechanism, said marking means further including a housing (22) having a cover (23) and accessible when said cover is open, and an ink supply container connected to said spraying head and positioned in said housing below a level of said head when the latter is in said use position.

5. The camera as defined in claim 4, further including a locking device (24) for said cover (23), said locking device being connected to said control device; and selection means (S) connected to said control device and controlling said cleaning position so as to release said cover (23) whereby said supply container is accessible and is set to said cleaning position by hand under pressure.

6. The camera as defined in claim 5, and including a housing cover (4*a*), said ink spraying head being accessible when said housing cover is opened, and a scraper (33) actuated by hand, said nozzles of said ink spraying head in said cleaning position (II) or in a position deviating from said cleaning position lying in a way of moving of said scraper.

7. The camera as defined in claim 5, wherein means for rotating and displacing said ink spraying head are provided which include an electric motor, a drive disc (48) engageable with and supporting said spraying head, an overload coupling interconnected between said motor and said drive disc, and a torsion spring (50) coupling said spraying head with said drive disc.

8. The camera as defined in claim 7, wherein said means further include a bearing eccentric (49, 44) for supporting said spraying head on said drive disc, said torsion spring having two radially protruding ends (50*a*, 50*b*), said drive disc having an eccentric pin (48*a*), said spraying head having also an eccentric pin (45), said eccentric pin of said drive disc being clamped with said eccentric pin of said spraying head between said protruding ends.

9. The camera as defined in claim 8, said spraying head having an eccentric control pin (46) positioned opposite to said bearing eccentric, said control pin driving said torsion spring.

10. The camera as defined in claim 9, said means further including a control cam face (55*a*, 55*b*) formed by two radial control slots (55*a*, 55*b*) which are offset from each other by about 90° and selectively receive and engage said control pin (46) in the use position (I) or in the inoperative position (III) of said spraying head.

11. The camera as defined in claim 1, further including a pressing spring (41) acting on said diaphragm cover (25) and compressable so as to press said diaphragm cover against said spraying head when the latter is in said inoperative position (III).

12. The camera as defined in claim 10, wherein said means further include a spring-biased gripping lever (57) positioned between between said radial control slots in a path of movement of said control pin (46), said lever having a hook-shaped end (57*a*) at which said control pin, upon selection and reaching said cleaning position (II) by said spraying head, is locked, a first switch element (51) positioned on said drive disc, and a stationary second switch element (52), said first switch element cooperating with said second switch element in said cleaning position (II) so that said electric motor is switched off in said cleaning position (II) selected by said control device (11) or by said selection means (S).

13. The camera as defined in claim 12, wherein said first and second switch elements become inoperative upon switching the camera off by said electronic control device (11), said gripping lever (57) being pivotable under the action of said bearing eccentric by means of said control pin (46), and further including a third switch element (47) on said spraying head and a fourth stationary switch element (54), said control pin being movable in said radial slot (55*b*) for said inoperative position (III), and said electric motor being switchable off by said third and fourth switch elements.

14. The camera as defined in claim 13, wherein said gripping lever (57) has a hook-shaped notch (57*b*) merging into said hook-shaped end (57*a*), said gripping lever and said spraying head being rotatable relative to each other by hand to a further servicing position, said control pin being lockable by said notch and said ink spraying head being further directed upwardly than in said cleaning or inoperative position.

15. The camera as defined in claim 14, further including a stationary fifth switch element (53), said third switch element (47) in said use position (I) cooperating with said fifth switch element (53) for switching said electric motor off during a marking process on said original.

16. The camera as defined in claim 3, wherein said transport means (6, 14) are coupled to said electronic control device (11) so that a transport speed of originals is synchronzied with a pressure pace of said spraying head.

17. The camera as defined in claim 16, wherein said transport means (6, 14) are controlled by said electronic control device so that speeds of originals moving under said ink spraying head and in said exposure station are synchronized.

18. The camera as defined in claim 1, wherein said spraying head is displaceable transversely of a direction of moving of said originals.

* * * * *